Reissued June 15, 1954 Re. 23,840

UNITED STATES PATENT OFFICE 23,840

LIQUID ANIONIC-DIALKYLOLAMIDE DETERGENT COMPOSITION

Peter T. Vitale, Fresh Meadows, Flushing, N. Y., and Ralph Spencer Leonard, Berkeley Heights, N. J., assignors to Colgate-Palmolive Company, a corporation of Delaware No Drawing. Original No. 2,607,740, dated August 19, 1952, Serial No. 159,854, May 3, 1950. Application for reissue August 18, 1953, Serial No. 375,084

18 Claims. (Cl. 252—153)

Matter enclosed in heavy brackets [ ] appears in the original patent but forms no part of this reissue specification; matter printed in italics indicates the additions made by reissue.

The present invention relates to new liquid synthetic detergent compositions and, more particularly, to compositions of the type of the water soluble anionic sulfated and sulfonated detergents in the liquid state having improved properties.

There has been a considerable amount of research to discover substances or additives which aid the efficiency of detergent compositions. The problem is exceedingly complex, however, in view of the various physico-chemical mechanisms or properties and the like involved in the action of a detergent composition including suspension, interfacial tension, micellar structure, dispersion, foam stability, etc. and the general difficulty usually in determining the particular mechanism which is being altered by changes in the formulation of detergent compositions.

During recent years, synthetic detergents of the type of the organic sulfates and sulfonates have been developed which in general have certain properties which render them more suitable than soaps for certain uses. By virtue of the diverse nature of such synthetic detergents in comparison to soap, and consequently the fact that they have extremely different properties in aqueous solution, e. g. the non-formation of insoluble precipitates in hard water, there has been uncovered a large field for research and development. In general, the exploration for suitable additives or builders for synthetic detergent compositions of the type of the anionic sulfates and sulfonates has been directed by the requirements of increased foaming and/or detersive power. While the exact relationship, if any, between foaming and detergency is not known, it is highly desirable that these detergent compositions exhibit excellent foaming properties, in addition to a high level of detersive efficiency, particularly for consumer appeal and certain home and industrial uses. In view of the complex nature of both the foam and detergency phenomena, the character of such non-soap synthetic detergents, and the many other variables in detergent compositions, additives in general exhibit a certan degree of specificity of action.

In general, because of technical facility of manufacture and relative ease of solution in water, most of these synthetic detergents are produced and sold in particulate form. Although generally more satisfactory in the form of solid particles for many uses these products do have certain disadvantages. Among these are the presence of a certain proportion of fines which may be sufficient to be irritative as a dust nuisance, bulkiness, possible development of tackiness, caking, frangibility, etc.

The preparation of a suitable synthetic detergent composition in liquid form is however a specialty problem and beset with many difficulties unique with such a preparation. A few of the vital considerations are set forth below individually, but it is to be noted of course that the development of a suitable liquid detergent composition necessarily involves an integration of the inter-relationship among such factors:

1. Viscosity.—The composition should be fluid to such an extent that it may be pourable from a container with ease. In general, the anionic sulfate and sulfonate detergents herein referred may be even solids at normal temperatures. In the molten state, they are usually highly viscous and tacky moreover.

2. Selective solvent.—The liquid media which may be employed must necessarily be selective in action. It should be somewhat miscible or soluble with water, render a high degree of fluidity to the composition, have solubilizing effects on the detergents, permit adequate concentration of solids, etc.

3. Cloud point—Clear point.—The composition should have sufficiently low cloud and clear points that it does not upon subjection to reasonable adverse conditions, e. g. slight chilling, separate into different phases or solidify, and does maintain preferably a high degree of sparkle and clarity of solution.

4. Foaming.—The compostion should yield a good volume of foam with a high degree of foam stability during washing operations. The foam should be of good creaminess or consistency, not break down readily in the presence of soil, etc.

5. Grease emulsification.—It should possess the ability to emulsify readily fats, oils, greases and the like in order to facilitate removal of the same in washing operations, particularly dishwashing.

6. Soil removal.—The detersive efficiency is in large measure due to the amount of soil removed. The composition should exhibit a high level of soil removal power, particularly in washing of fine fabrics, dishwashing, and the like.

7. Concentration.—The composition should preferably possess such solubility characteristics that a concentrated solution may ordinarily be prepared for use whereby a relatively small amount may be conveniently utilized by the consumer and yet be adequate for many uses.

8. Non-irritative.—The solution should be non-irritative to the general public as much as possible and possess a desirable feel to the hands.

Other vital considerations will be apparent from the following description.

It has now been discovered that the incorporation of dialkylolamides of higher fatty acids of about 10–14 carbon atoms in liquid synthetic detergent compositions consisting essentially of the [anionic sulfated and sulfonated detergents are] *anionic higher alkyl aryl sulfonated and higher alkyl sulfated detergents, as hereinafter described, are* effective to achieve a significant and synergistic enhancement in surface-active properties such as detergency and foaming. More particularly, the present invention comprises a liquid detergent composition consisting essentially of the *said* water soluble anionic sulfated or sulfonated detersive salts, a proportion of capric, lauric or myristic dialkylolamide effective to enhance the action of the detergent composition in aqueous solution, and a solubilizing diluent.

The enhancing additives of the present invention are characterized by their weakly polar nature and may be represented by the formula:

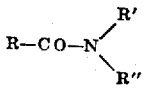

wherein R—CO represents a fatty acyl radial of 10–14 carbon atoms, and R′ and R″ may be the same or different, each being a lower hydroxyalkyl group of preferably up to about 5 and, more particularly, from about 2 to about 5 carbon atoms. The hydroxyalkyl groups may be mono- or polyhydroxy alkyl. Examples of suitable additives are N,N bis (2) hydroxyethyl) lauramide, N,N bis (2 hydroxyethyl) myristamide, N,N bis (2 hydroxyethyl) capramide, N,N bis (2,3 dihydroxypropyl) lauramide, N,N bis (2,3 dihydroxypropyl) myristamide, N,N bis (3-hydroxypropyl) lauramide, N,N bis (3 hydroxypropyl) capramide, N,N bis (2 hydroxypropyl) myristamide, N,N bis (4 hydroxybutyl) lauramide, etc. Because of the excellent results obtained it is preferred to use the diethanolamide compounds and the additives possessing a fatty acyl radical of 12–14 carbon atoms.

These dialkylolamides may be prepared in any suitable manner and numerous processes for their production are well known in the art. A convenient and economical mode of synthesis involves the condensation of the higher fatty acylating compounds (e. g. lauric acid, lauric acid halide, etc.) with a suitable amino compound to produce a reaction product having the desired amide structure.

The higher fatty acylating substances may be derived from pure, impure or commercial grades of capric, lauric or myristic acids and the like. More particularly, these acids may be produced from fatty oils, fats, greases, and other natural sources or be of synthetic origin as derived from the oxidation of hydrocarbons. According to its origin and the degree and manner of purification, capric, lauric and myristic acids may be commonly admixed or associated with other fatty acids of higher and lower molecular weight. It is within the scope of the invention that the capryl, lauroyl and myristoyl compounds may be associated with other fatty substances and the like provided the character and amount of such other materials are not sufficient to substantially neutralize or materially affect the enhancing power of the additives in the relationship set forth. Thus, there may be suitably employed for the preparation of the dialkylolamide additives the commercially pure capric, lauric and myristic acids having a concentration of such acids of about 90% and above. A typical composition of commercially pure lauric acid may be 90% lauric acid, 9% myristic acid, 1% unsaturated acids, trace capric acid. Another suitable fatty acid mixture is "topped" coconut oil fatty acids produced by the removal of a low-boiling fraction, e. g. 10–15%, from coconut oil fatty acids.

Among the dialkylolamines suitable for condensation are diethanolamine, N,N bis (2,3 dihydroxypropyl) amine, dipropanolamine, N,N, bis (2 hydroxypropyl) amine, dibutanolamine, etc. It is to be understood that the dialkylolamines may be utilized in pure, impure, or commercial form.

According to the circumstances of manufacture of the dialkylolamide, it may be chemically and/or physically associated with other materials such as soap, free alkylolamine, piperazine type derivatives, etc. The presence of varying amounts of such materials and the like in admixture with dialkylolamide is contemplated within the scope of the present invention, provided the same are not significant enough to materially neutralize or substantially adversely affect the desired improvements to be accomplished with the combination of the anionic detergent and the dialkylolamide additive.

It is a particular feature of this invention that the reaction product of the higher fatty acylating substance and the dialkylolamine comprising the desired dialkylolamide and other derivatives as produced under certain conditions may be utilized with marked success as additives in the novel compositions of the present invention. More particularly, the product is to be produced by the condensation of the suitable higher fatty acids or their equivalent with an equivalent or an excess of dialkylolamine, the molar ratio being from about 1:1 to about 1:10 but preferably up to about 1:5 and usually from about 1:2 to about 1:3, at from about 100° C. to about 200° C., and preferably from about 120° C. to 180° C., and achieving a reaction mixture equilibrium comprising an effective amount of the dialkylolamide. With the fatty acids, an excess of dialkylolamine will usually be used, preferably up to about 3:1. Using fatty acids or anhydrides illustratively as reactants, as the water is distilled off or otherwise removed during the reaction, the acid number falls indicating formation of amides. The reaction is to be continued until the desired amount of water has been removed, e. g. not substantially in excess of 15% acid or soap and preferably up to about 10% as determined by the acid value resulting from titration of the reaction mixture with potassium hydroxide. With the use of methyl esters and the like as reactants, the amount of alcohol liberated is an index of completion of the reaction. In the case of the acid chlorides and the like as reactants, formation of chloride ion or its equivalent may be determined also. This condensation reaction between the higher fatty acids and the alkylolamines or their equivalents is highly complex and produces a variety of products in addition to the desired di-alkylolamide. Accordingly, it is necessary to achieve an equilibrium of the reaction mixture containing an effective proportion of the dialkylolamide. This equilibrium may be achieved usually by permitting the reaction mixture to cool relatively slowly or maintaining the reaction mixture at slightly elevated temperatures for a sufficient period of time. The optimum equilibrium of the reaction mixture however achieved may be determined by routine tests such as hereinafter set forth wherein the novel liquid detergent compositions are subjected to practical washing operations. A typical suitable reaction mixture cited for illustrative purposes and resulting from the condensation of commercially distilled lauric acid in 90% purity and commercial diethanolamine contains the following components on a solids basis: diethanolamide about 65%, diethanolamine soap about 10%, free amine, diethanolpiperazine and minor amounts of possibly other substances totaling 25%. The reaction product may contain usually minor amounts of water also, e. g. about 5%.

The novel compositions of the present invention contain as the active ingredient the [anionic sulfated and sulfonated detergents (in-] *following anionic higher alkyl aryl sulfonated and higher alkyl sulfated detergents* (including suitable mixtures thereof). [Included therein are the aliphatic sulfated or sulfonated agents, such as the aliphatic acyl-containing compounds wherein the acyl radical has about 8 to about 22 carbon atoms, and more particularly, the aliphatic carboxylic ester type, containing at least about 10 and preferably about 12 to about 26 carbon atoms to the molecule. Among the aliphatic detersive compounds, it is preferred to use the sulfated aliphatic compounds having about 12 to about 22 carbon atoms.] [As suitable] *Suitable* examples of aliphatic detergents [may be found the sulfuric acid esters of polyhydric alcohols incompletely esterified with higher fatty acids, e. g. coconut oil monoglyceride mono sulfate, tallow diglyceride monosulfate;] *are* the long chain pure or mixed higher alkyl sulfates [, e. g.] *selected from the group consisting of* lauryl sulfate [, cetyl sulfate,] higher fatty alcohol sulfates derived from reduced coconut oil fatty acids [; the hydroxy sulfonated higher fatty acid esters, e. g. higher fatty acid esters of 2,3 dihydroxy propane sulfonic acid; the higher fatty acid esters of low molecular weight alkylol sulfonic acids, e. g. oleic acid ester of isethionic acid; the higher fatty acid ethanolamide sulfates; the higher fatty acid amides of amino alkyl sulfonic acids, e. g. lauric amide of taurine, and the like].

[Within the ambit of the invention are the alkyl aryl sulfonate detergents also.] The[se] aromatic sulfonate detergents are also known in the art. There may be mononuclear or polynuclear in structure. More particularly the aromatic nucleus may be derived from benzene, toluene, xylene, phenol, cresols, naphthalene, etc. The alkyl substituent on the aromatic nucleus may vary widely, as long as the desired detergent power of the active ingredient is preserved. While the number of sulfonic acid groups present on the nucleus may vary it is usual to have one such group present in order to preserve as much as possible a balance between the hydrophilic and hydrophobic portions of the molecule.

More specific examples of suitable alkyl aromatic sulfonate detergents are the higher alkyl aromatic sulfonates. The higher alkyl substituent on the aromatic nucleus may be branched or straight-chain in structure; it comprises moreover such groups as decyl, dodecyl, keryl, pentadecyl, [hexadecyl,] mixed long-chain alkyls derived from long-chain fatty materials, cracked paraffin wax olefins, polymers of lower monoolefins, etc. Preferred examples of this class are the higher alkyl mononuclear aryl sulfonates wherein the alkyl group is [about 8 to about 22,] *8 to 15 carbon atoms.* [and preferably about 12 to 18 carbon atoms.] More particularly, it is preferred to use the higher alkyl benzene sulfonates [wherein the higher alkyl group is about 12 to 16 carbon atoms]. For example, propylene may be polymerized to the tetramer and condensed with benzene in the presence of a Friedel-Crafts catalyst to yield essentially the dodecyl benzene derivative which is suitable for sulfonation to the desired sulfonate compounds.

These various anionic detergents are to be used in the form of their water soluble salts such as the amine, alkali metal and alkaline earth metal salts. While the sodium, potassium salts and the like may be suitably employed, it is preferred to use the ammonium, lithium, amine and alkylolamine salts in view of their generally greater solubility in aqueous solution. More particularly, it is preferred to use the monoethanolamine, diethanolamine, triethanolamine salts and mixtures thereof because of the excellent results attained with their use [, particularly with the higher alkyl benzene sulfonates, the higher alkyl sulfates, and the higher fatty acid monoglycerides sulfates (and mixtures thereof) as the active ingredients].

Any suitable solvent may be employed as the liquid medium. It should possess several essential characteristics since it functions necessarily as an integral part of the composition. Beside its chemical inertness, it must have a solubilizing action on the solids. It should possess a substantial solubility for the anionic detergent and the dialkylolamide additive jointly; it should be water miscible or water soluble in view of the fact that the present compositions are designed at least in part for use in aqueous solutions; it should possess a relatively low viscosity in order to impart to the composition proper fluidity; it should preferably possess reasonably good stability to heat, light, chilling, etc. It has been found that a low molecular weight hydroxyl-containing solvent may be suitably employed. More particularly, a liquid solvent medium may be selected from the group consisting of water, low molecular weight alcohols and mixtures thereof. The alcohols should preferably be the saturated aliphatic type; they may be mono- or polyhydric in character, and may contain inert solubilizing groups such as ether linkages. Suitable examples are ethyl alcohol, n-propyl alcohol, isopropyl alcohol, n-butyl alcohol. In comparison to ethyl alcohol and the like, the higher alcohols such as butanol and the like are not preferred since the latter have in general a comparatively undesirable odor and less solubility in water. Additional suitable solvents of the polyhydric alcohol type are ethylene glycol, propylene glycol, glycerol, etc. Alcohols possessing ether linkages are monomethyl ether of ethylene glycol, monoethyl ether of ethylene glycol, diethylene glycol, diethylene glycol monoethyl ether, monobutyl ether of diethylene glycol, monomethyl ether of diethylene glycol, dioxan, etc. It is preferred to use water, the aliphatic monohydric alcohols and the dihydric alcohols of about 2 to about 4 carbon atoms, and the lower alkyl ethers of said dihydric alcohols, and mixtures thereof.

The dialkylolamide may be incorporated with the anionic detergent at any point during the manufacturing process at which subsequent operations will not adversely modify the properties of the detergent compositions. Preferred procedures are the melting of the dialkylolamide and stirring it into a warm water, water and alcohol, or alcohol solution of the detergent, or the dissolving of the additive in alcohol or water and stirring the mixture into the anionic detergent. Thereafter, the mixture may be further diluted to desired concentrations if necessary.

The ratio of the dialkylolamide additive to the anionic detergents should be sufficient to effect the desired improvements in detersive capacity and/or foaming power. The proportion is highly variable depending upon the specific materials to be employed and will generally be from about 1:10 to 2:1 by weight for improvement in foaming and from about 1:7 to about 2:1 for improvements in detersive power also. It is preferred that the proportions be from about 1:7 to about 1:1 for optimum effects usually.

The amount of solvent should be sufficient to dissolve and liquefy the solid components. The amount of total solids in such liquid compositions is variable and is limited chiefly by the degree of solubility in the liquid medium. For optimum effects, the amount of total solids should be from about 30% to about 90% depending upon the solvent power, and preferably at least about 40%. More particularly, it is preferred that the anionic detergent be at least about 30%, and generally from about 40–60%, with the concentration of dialkylolamide usually at least about 10% and preferably from about 10 to about 20%. Where these solids are not sufficiently soluble in water alone for example, their solubility may be appropriately improved by the use of a mixed solvent medium, e. g. water and ethyl alcohol. While it is preferred to prepare these compositions in the form of a concentrated solution as indicated above whereby the consumer may utilize the same conveniently and economically, it is within the scope of the invention that these compositions may be further diluted and be useful for many purposes, e. g. window, walls, woodwork, car washing, etc.

The following data and examples are additionally illustrative of the nature of the invention and it will be understood that the invention is not limited thereto.

From the viewpoint of foaming generally, the novel compositions of the present invention are characterized by increased stability of the foam produced in washing operations in comparison to the foaming effects produced by the compositions without the dialkylolamide. The foam of the compositions containing an anionic-dialkylolamide combination have good creaminess and consistency, do not readily break down by evaporation, have in general a long drainage time and contain an increased amount of liquid.

It has also been found that this combination tends to increase the tolerance of the detergent composition for the assimilation or holding in suspension of a miximum amount of dirt, grease, etc. with less foam loss than is found without the use of the dialkylolamide additives.

In practical dish pan tests wherein a small amount of the liquid detergent is added to a dishpan of water and greased dishes are washed by hand, it can be shown that the anionic detergent-dialkylolamide combination exhibits superior foaming properties. As increasing numbers of greased plates are washed the foam decreases. The rate of foam decrease is considerably slower on solutions of the compositions of the present invention than with corresponding solutions of the anionic detergent or dialkylolamide alone. Moreover, the present compositions exhibit high emulsification power on the fats, oils, and other greases normally adhering to dishes.

Table I discloses comparatively the results in foam endurance or duration obtained in the dishwashing of greased plates with three compositions. Composition I contains 52 parts anionic active ingredient consisting essentially of the triethanolamine salt of dodecyl benzene sulfonate with a minor amount of triethanolamine sulfate, and 48 parts solvent consisting of water and ethyl alcohol mixture. Composition II consists of 13 parts lauroyl diethanolamide with the same diluent as the remainder. Composition III contains the desired combination of I and II, namely 52 parts anionic active ingredient, 13 parts lauroyl diethanolamide, and the remainder being the water-ethyl alcohol solvent. The tests are conducted in soft water at 115° F. with the number of greased plates washed by the anionic detergent alone (composition I) before expiration of the foam being taken as a standard of 100%. The results with compositions II and III are tabulated in terms of percent of the standard.

Table I

| | Composition | Foam Endurance in Dishwashing |
|---|---|---|
| | | Per Cent |
| I | Triethanolamine salt of dodecyl benzene sulfonate (52 parts) | 100 |
| II | Lauroyl diethanolamide (13 parts) | 69 |
| III | Triethanolamine salt of dodecyl benzene sulfonate (52 parts)+lauroyl diethanolamide (13 parts) | 212.5 |

The unusual effects obtained by the compositions of the present invention (e. g. composition III) is evident from the data. It is clear that the combination achieves a synergistic enhancement in foam duration and resistance to greasy soil in comparison to the effects obtained by the individual use of identical amounts of the components.

It may be added moreover, that the combination gave a high volume of foam of good consistency and relatively small bubbles. The anionic synthetic detergent alone gave a satisfactory volume of foam but of quite light consistency and composed of relatively large bubbles. The dialkylolamide exhibits a relatively poor volume of foam which is also of light consistency and large bubbles.

The grease adhering to the dishes appeared to be satisfactorily emulsified and removed for the duration of washing with the anionic detergent alone and with the anionic-dialkylolamide combination. The fact must be noted however that over twice as many greased dishes were washed by the combination in the above relationship. On the other hand, the grease was unsatisfactorily emulsified using the dialkylolamide alone after only a very minor proportion of dishes were washed.

Table II indicates the results obtained in similar dishwashing operations in hard water (300 p. p. m.) at 115° F. of Composition III above containing the anionic detergent-dialkylolamide combination in comparison to a standard detergent composition consisting of a 60% solution of the same anionic detergent. The dishwashing operations were continued until both the foam had expired and unemulsified grease appeared on the surfaces of the washed dishes. The data is set forth as the percent improvement achieved using the combination in comparison to the effects encountered using the anionic detergent alone as a standard.

Table II

| | Percent |
|---|---|
| Improvement in grease emulsification using anionic-dialkylolamide combination | 167 |
| Improvement in foam endurance using anionic-dialkylolamide combination | 100 |

The unusual results effected by the combination is evident from the data. The fact that the testing conditions were severe (water of 300 p. p. m. hardness) and that the standard composition contains 60% anionic detergent in comparison to the use of 52% in the novel compositions renders the results all the more striking.

In addition, the liquid detergent composition containing the combination indicated above exhibits a cloud point of as low as approximately −60° C. on prolonged chilling and a clear point of about −35° C. on slow warming. The stability of the composition under such marked adverse conditions is highly desirable for the production of a successful liquid detergent composition.

It has been found moreover, that the substitution of palmitoyl-diethanolamide for the lauroyl compound in the compositions of the present invention is unsuccessful to produce desired results. The relatively greater insolubility of the palmitoyl-diethanolamide is such that the compositions cannot satisfactorily be prepared as sufficiently concentrated solutions in an efficient and economical manner. Dishwashing experiments in soft water with palmitoyl-diethanolamide in combination with the same anionic detergent as used above in a 1:10 and 2:10 ratio by weight discloses that the foam volume and its stability or resistance to greasy soil is consistently poorer than the effects obtained by use of the anionic detergent alone.

In addition, the effects on the foaming characteristics can be studied quantitatively for a given composition by means of a foam consistency test. Briefly, this test consists of the formation of a foam by standardized agitation of 500 cc. of a detergent at 110° F. in a two quart unsilvered Dewar flask. The foam formed after a 10 minutes agitation period is then measured with a consistometer after standing for 5, 10 and 15 minutes. The readings are an indication of the foam consistency or bodying effect. On a comparative basis, higher readings represent improved consistency or body of the foam.

This consistometer is a means for measuring the minimum torque necessary for rotation of a paddle of any standard size through a foam. This device applies the torque by means of a coil spring which has its inner end attached to a paddle shaft and the outer end attached to a circular plate which can be rotated. The degrees through which the spring may be twisted before the paddle starts to move in the foam may be readily determined. An indicator needle is attached to the top of the paddle shaft and a circular scale divided into 360° is set on the plate which holds the outer end of the spring. The paddle shaft is held in place by a pair of ball bearing races in such a way that it can turn freely.

Comparative foam consistency tests are conducted in distilled water using as a standard triethanolamine salt of dodecyl benzene sulfonate in comparison to a detergent composition consisting of a mixture of the sulfonate salt and lauroyl diethanolamide, the ratio of anionic detergent to diethanolamide being 6.66 to 1. The results are set forth in Table III, the consistometer readings representing the averages at 5, 10 and 15 minute intervals.

Table III

| Composition | Total Concentration in Solution | Consistometer Reading |
|---|---|---|
| | Percent | Degrees |
| Anionic Detergent alone | .03 | 55 |
| | .06 | 220 |
| Anionic-Dialkylolamide | .03 | 230 |
| Combination (6.66:1) | .06 | 260 |

It is evident from the data that the mixed anionic - dialkylolamide detergent composition yields a high level of creaminess and foam stability in comparison to the relatively flimsy sudsing power exhibited by the anionic detergent alone.

The effect on detergency on compositions of the present invention may be indicated by a standard soil removal test. This testing procedure involves the uniform soiling, washing with particular detergent compositions in distilled water at 110° F.±2° F. and drying of a large number of woolen swatches. The whiteness of the various test swatches are measured by a Hunter reflectometer. The units of soil removed may be calculated by subtracting the average reflectivity of unwashed control samples from that of the washed swatches.

Table IV indicates the percent improvement in soil removal on wool swatches using the detergent composition comprising 52% anionic detergent consisting essentially of the triethanolamine salt of dodecylbenzene sulfonate, 13% lauroyl diethanolamide, and 35% diluent consisting of a water and ethyl alcohol mixture, in comparison to the standard detergent composition consisting of a 60% solution of the same anionic detergent without added dialkylolamide at various indicated total concentrations of the detergent compositions in distilled water.

Table IV

| Total Concentration of Detergent Composition (Per Cent) | Percent Improvement in Soil Removal of Mixed Anionic-Dialkylolamide Composition |
|---|---|
| 0.15 | 171 |
| 0.25 | 94 |
| 0.40 | 93 |
| 0.75 | 65 |

The synergistic improvement in detergency resulting from the use of the mixed anionic-dialkylolamide combination is graphically evident from the data.

Example I

An improved liquid synthetic detergent composition is prepared by mixing 13 parts of lauroyl diethanolamide, an anionic detergent base containing 44.7 parts triethanolamine salt of dodecyl benzene sulfonate and 7.5 parts triethanolamine sulfate, 22.3 parts water and 12.5 parts ethyl alcohol.

Example II

The composition of Example I is reproduced using the lithium salt of the anionic detergent in place of the triethanolamine salt.

Example III

The composition of Example I is reproduced using the triethanolamine salt of lauryl sulfate as the anionic detergent.

Example IV

An improved liquid synthetic detergent composition is prepared by mixing the ingredients of Example I with the modification that a fatty acid-diethanolamine reaction mixture prepared as follows is substituted for the lauroyl diethanolamide. "Topped" coconut oil fatty acids are reacted with commercial diethanolamine in a 1:2 ratio at about 150° C. until the acid value drops to about 10. The reaction mixture is finished by a slow cooling process which involves cooling the mixture with water at 120° F. circulating in a jacket, the mixture being agitated during this time. When the mixture reaches about 120° F., the agitation is stopped and the mixture allowed to stand overnight during which time further slow cooling takes place.

Example V

The process of Example III is repeated with the modification that the dialkylolamide reaction mixture is made in accordance with the following procedure. Commercial lauric acid is melted and commercial diethanolamine is added with agitation till a 1:2 molar ratio is reached. The reaction mixture is heated at 140°–160° C. under vacuum. At this temperature, distillation of water occurs until the acid or soap content has been reduced to a value equivalent to 4.35%, calculated as diethanolamine laurate. The reaction product is rapidly run out of the reactor with cooling and permitted to cool gradually.

The following formulations are also productive of a high level of foaming and detersive properties:

Example VI

| | Per cent |
|---|---|
| Triethanolamine salt of lauryl sulfate | 25 |
| Triethanolamine salt of dodecyl benzene sulfonate | 25 |
| N,N bis (2,3 dihydroxypropyl) myristamide | 15 |
| Water | 15 |
| Ethyl alcohol | 20 |

[Example VII]

| | [Per cent] |
|---|---|
| [Ammonium salt of higher fatty acid monoglyceride sulfates derived from coconut oil | 50 |
| Myristoyl and lauroyl diethanolamide (1:1) | 10 |
| Water | 15 |
| Ethylene glycol | 25] |

Example VII[I]

| | Per cent |
|---|---|
| Monoethanolamine salt of dodecyl benzene sulfonate | 35 |
| Monoethanolamine salt of higher fatty acid monoglyceride sulfates derived from coconut oil | 20 |
| Lauroyl diethanolamide | 12 |
| Water | 13 |
| Monomethyl ether of ethylene glycol | 20 |

Example [IX] *VIII*

| | Per cent |
|---|---|
| Triethanolamine salt of kerylbenzene sulfonate | 45 |
| Commercial lauroyl acid diethanolamide condensate containing 65% diethanolamide, 10% soap, 25% diethanolamine and by-products | 31 |
| Water | 17 |
| Monoethyl ether of diethylene glycol | 7 |

[Example X]

| | [Per cent] |
|---|---|
| [Higher fatty acid amides of taurine derived from coconut oil-triethanolamine salt | 40 |
| Capryl and lauroyl diethanolamide (1:1) | 20 |
| Water | 15 |
| Ethyl alcohol | 25] |

The term "consisting essentially of" as used in the definition of the ingredients present in the composition claimed is intended to exclude the presence of other materials in such amounts as to interfere substantially with the properties and characteristics possessed by the composition set forth but to permit the presence of other materials in such amounts as not substantially to affect said properties and characteristics adversely.

Although the present invention has been described with reference to particular embodiments and examples, it will be apparent to those skilled in the art that variations and modifications can be substituted therefor without departing from the principles and true spirit of the invention.

Having described the invention what is desired to be secured by Letters Patent is:

1. A concentrated liquid detergent composition *having a high level of performance in dishwashing* consisting essentially of water-soluble [detergent selected from the class consisting of water-soluble salts of anionic sulfated and sulfonated detergents having a long aliphatic chain of 8 to 22] *anionic salt of alkyl aryl sulfonate detergent, said alkyl group having 8 to 15* carbon atoms, and a dialkylolamide compound represented by the formula;

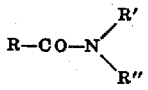

wherein R—CO— is a fatty acyl radical of 10 to 14 carbon atoms, and R′ and R″ are hydroxyalkyl groups of up to about 5 carbon atoms each, the ratio of said dialkylolamide compound to anionic detergent being from about 1:10 to about 2:1 by weight, and said dialkylolamide and anionic detergent together being at least about 30% by weight in a selective liquid solvent therefor.

2. A concentrated liquid detergent composition *having a high level of performance in dishwashing* consisting essentially of water-soluble salt of higher alkyl mononuclear aryl sulfonate detergent, said higher alkyl group having 8 to [22] *15* carbon atoms, and a dialkylolamide compound represented by the formula:

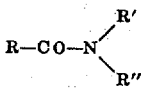

wherein R—CO— is a fatty acyl radical of 10 to 14 carbon atoms, and R′ and R″ are hydroxyalkyl groups of up to about 5 carbon atoms each, the ratio of said dialkylolamide compound to anionic detergent being from about 1:10 to about 2:1 by weight, and said dialkylolamide and anionic detergent together being at least about 30% by weight in a selective liquid solvent therefor.

3. A concentrated liquid detergent composition *having a high level of performance in dishwashing* consisting essentially of water-soluble salt of higher alkyl benzene sulfonate detergent, said higher alkyl group having 8 to [22] *15* carbon atoms, and a diethanolamide compound represented by the formula:

$$R—CO—N—(CH_2CH_2OH)_2$$

wherein R—CO— is a saturated fatty acyl radical of 10 to 14 carbon atoms, the ratio of said diethanolamide compound to anionic detergent being from about 1:10 to about 2:1 by weight, and said diethanolamide and anionic detergent together being at least about 40% by weight in a selective liquid solvent therefor.

4. A concentrated liquid detergent composition *having a high level of performance in dishwashing* consisting essentially of anionic [detergent selected from the class consisting of water-soluble salts of anionic sulfated and sulfonated detergents having a long aliphatic chain of 8 to 22] *water-soluble salt of alkyl benzene sulfonate detergent, said alkyl group having 8 to 15* carbon atoms, and a dialkylolamide compound represented by the formula:

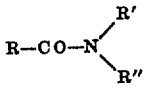

wherein R—CO is a fatty acyl radical of 10 to 14 carbon atoms, and R′ and R″ are hydroxyalkyl groups of up to about 5 carbon atoms each, the ratio of said dialkylolamide compound to anionic detergent being from about 1:10 to about 2:1 by weight, and said dialkylolamide and anionic detergent together being at least about 30% by weight in a selective liquid solvent therefor comprising a low molecular weight aliphatic alcohol.

5. A concentrated liquid detergent composition in accordance with claim 4 wherein the fatty acyl radical is lauroyl and the hydroxyalkyl groups have 2 to 3 carbon atoms each.

6. A concentrated liquid detergent composition in accordance with claim 4 wherein the fatty acyl radical is myristoyl and the hydroxyalkyl groups have 2 to 3 carbon atoms each.

7. A concentrated liquid detergent composition *having a high level of performance in dishwashing* consisting essentially of anionic [detergent selected from the class consisting of water-soluble salt of anionic sulfated and sulfonated detergents having a long aliphatic chain of 8 to 22] *water-soluble salt of alkyl mononuclear aryl sulfonate detergent, said alkyl group having 8 to 15* carbon atoms, and a diethanolamide compound represented by the formula:

$$R—CO—N—(CH_2CH_2OH)_2$$

wherein R—CO— is a saturated fatty acyl radical of 10 to 14 carbon atoms, the ratio of said diethanolamide compound to anionic detergent being from about 1:10 to about 2:1 by weight, and said diethanolamide and anionic detergent together being at least about 40% by weight in a selective liquid solvent therefor comprising a low molecular weight aliphatic alcohol.

8. A concentrated liquid detergent composition in accordance with claim 7 wherein said solvent comprises an alcohol selected from the group consisting of aliphatic monohydric and dihydric alcohols of about 2 to 4 carbon atoms, and the lower alkyl ethers of said dihydric alcohols.

9. A concentrated liquid detergent composition *having a high level of performance in dishwashing* consisting essentially of water-soluble salt of higher alkyl benzene sulfonate detergent, said higher alkyl group having 8 to [22] *15* carbon atoms, and a diethanolamide compound represented by the formula:

$$R—CO—N—(CH_2CH_2OH)_2$$

wherein R—CO— is a saturated fatty acyl radical of 10 to 14 carbon atoms, the ratio of said diethanolamide compound to anionic detergent being from about 1:10 to about 2:1 by weight, and said diethanolamide and anionic detergent together being at least about 40% by weight in a selective liquid solvent therefor comprising a low molecular weight aliphatic alcohol.

10. A concentrated liquid detergent composition *having a high level of performance in dishwashing* consisting essentially of a solution of a mixture of anionic [detergent selected from the class consisting of water-soluble salts of anionic sulfated and sulfonated detergents having a long aliphatic chain of 8 to 22 carbon atoms, and a] *water-soluble salt of alkyl benzene sulfonate detergent, said alkyl group having 8 to 15 carbon atoms, and a* dialkylolamide compound represented by the formula:

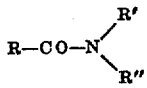

wherein R—CO— is a saturated fatty acyl radical of 10 to 14 carbon atoms, and R′ and R″ are hydroxyalkyl groups of up to about 5 carbon atoms each, the ratio of said dialkylolamide compound to anionic detergent being from about 1:7 to about 1:1 by weight, and said dialkylolamide and anionic detergent together being at least about 30% by weight in a selective liquid solvent phase therefor comprising water and an aliphatic saturated lower monohydric alcohol.

11. A concentrated liquid detergent composition *having a high level of performance in dishwashing* consisting essentially of a solution of a mixture of anionic [detergent selected from the class consisting of water-soluble salts of anionic sulfated and sulfonated detergents having a long] *water-soluble salt of alkyl mononuclear aryl sulfonate detergent, said alkyl group having* [aliphatic chain of] 8 to [22] *15* carbon atoms, and a diethanolamide compound represented by the formula:

$$R—CO—N—(CH_2CH_2OH)_2$$

wherein R—CO— is a saturated fatty acyl radical of 10 to 14 carbon atoms, the ratio of said diethanolamide compound to anionic detergent being from about 1:10 to about 2:1 by weight, and said diethanolamide and anionic detergent together being at least about 40% by weight in a selective liquid solvent phase therefor comprising water and an aliphatic saturated lower monohydric alcohol mixture.

12. A concentrated liquid detergent solution in accordance with claim 11 wherein said anionic detergent is essentially water-soluble higher alkyl benzene sulfonate salt.

[13. A concentrated liquid detergent solution in accordance with claim 11 wherein said anionic detergent is essentially water-soluble higher alkyl sulfate salt.]

14. A concentrated liquid detergent solution in accordance with claim 11 wherein said diethanolamide is at least about 10% by weight.

15. A concentrated liquid detergent solution in accordance with claim 11 wherein said alcohol is ethyl alcohol.

16. A concentrated liquid detergent solution in accordance with claim 11 which contains sodium salt of said water-soluble anionic detergent.

17. A concentrated liquid detergent solution in accordance with claim 11 which contains an ethanolamine salt of said water-soluble anionic detergent.

18. A concentrated liquid detergent solution in accordance with claim 11 which contains ammonium salt of said water-soluble anionic detergent.

*19. A concentrated liquid detergent composition consisting essentially of a solution of a mixture of anionic water-soluble salt of higher alkyl*

*sulfate detergent selected from the group consisting of lauryl sulfate and coconut fatty alcohol sulfate detergents, and a diethanolamide compound represented by the formula:*

$$R—CO—N—(CH_2CH_2OH)_2$$

*wherein R—CO— is a saturated fatty acyl radical of 10 to 14 carbon atoms, the ratio of said diethanolamide compound to anionic detergent being from about 1:10 to about 2:1 by weight, and said diethanolamide and anionic detergent together being at least about 40% by weight in a selective liquid solvent phase therefor comprising water and an aliphatic saturated lower monohydric alcohol mixture.*

References Cited in the file of this patent or the original patent

UNITED STATES PATENTS

| Number | Name | Date |
|---|---|---|
| 2,173,448 | Katzman | Sept. 19, 1939 |
| 2,383,737 | Richardson | Aug. 28, 1945 |